(12) United States Patent
Reyna et al.

(10) Patent No.: US 8,719,866 B2
(45) Date of Patent: May 6, 2014

(54) EPISODE PICKER

(75) Inventors: Jorge Fernando Reyna, Hayward, CA (US); Gilles Serge BianRosa, Redwood City, CA (US); Christophe Jean-Claude Gillet, San Francisco, CA (US); Keith Ohlfs, Redwood City, CA (US)

(73) Assignee: Fanhattan LLC, San Mateo, CA (US)

( * ) Notice: Subject to any disclaimer, the term of this patent is extended or adjusted under 35 U.S.C. 154(b) by 128 days.

(21) Appl. No.: 13/149,521

(22) Filed: May 31, 2011

(65) Prior Publication Data

US 2012/0311638 A1 Dec. 6, 2012

(51) Int. Cl.
*H04N 5/445* (2011.01)
*G06F 3/00* (2006.01)
*G06F 13/00* (2006.01)

(52) U.S. Cl.
USPC .................. 725/43; 725/42; 725/50; 725/52; 725/53; 725/61

(58) Field of Classification Search
USPC .............................. 725/40–47, 50, 52–53, 61
See application file for complete search history.

(56) References Cited

U.S. PATENT DOCUMENTS

| | | | |
|---|---|---|---|
| 2003/0046694 A1 | 3/2003 | Istvan | |
| 2003/0167471 A1* | 9/2003 | Roth et al. | 725/87 |
| 2005/0204388 A1* | 9/2005 | Knudson et al. | 725/58 |
| 2006/0253782 A1 | 11/2006 | Stark | |
| 2008/0065638 A1 | 3/2008 | Brodersen et al. | |
| 2009/0158326 A1* | 6/2009 | Hunt et al. | 725/38 |
| 2009/0249398 A1* | 10/2009 | Cirrincione et al. | 725/43 |
| 2009/0271706 A1 | 10/2009 | Volk | |
| 2010/0175090 A1* | 7/2010 | Cordray | 725/58 |
| 2011/0107220 A1* | 5/2011 | Perlman | 715/720 |

FOREIGN PATENT DOCUMENTS

| | | |
|---|---|---|
| WO | WO-2012166823 A2 | 12/2012 |
| WO | WO-2012166823 A3 | 12/2012 |

OTHER PUBLICATIONS

"International Application Serial No. PCT/US2012/040045, International Search Report mailed Dec. 27, 2012", 4 pgs.
"International Application Serial No. PCT/US2012/040045, Written Opinion mailed Dec. 27, 2012", 5 pgs.
"International Application Serial No. PCT/US2012/040045, International Preliminary Report on Patentability mailed Dec. 12, 2013", 5 pgs.

* cited by examiner

*Primary Examiner* — Jason Salce
(74) *Attorney, Agent, or Firm* — Schwegman, Lundberg & Woessner, P.A.

(57) ABSTRACT

In a method and system for accessing content, a selection of a media content item having at least one set of episodes is received. Each of the at least one set of episodes is displayed as a user-selectable element in a user interface. A selection of a user-selectable element corresponding to a set of the at least one set of episodes is received. The display of the selected user-selectable element is expanded to display the episodes of the set within the selected user-selectable element, with each episode of the episodes of the set being represented by an additional user-selectable element. A selection of an episode from the set of episodes is received. At least one content source from which the selected episode is available to be retrieved is displayed. A content source of the at least one content source from which the selected episode is to be retrieved is received.

28 Claims, 8 Drawing Sheets

EPISODE PICKER

TECHNICAL FIELD

Example embodiments of the present application generally relate to media content, and more specifically, to a system and method for selecting episodic content from one or more content sources.

BACKGROUND

Television programs, mini-series, documentaries, and other recurring forms of media content are generally structured as one or more series of episodes or programs. In some instances, the episodes or programs may be serialized, but in other instances, each episode or program may stand alone as an independent program. Generally, each episode or program is broadcast as part of a television transmission, although in some instances, an episode or program may be released directly for home video distribution.

In the event a user did not view the episode when it was originally broadcast, the user's options for the viewing the episode are generally limited to waiting for the episode to be re-aired or released as part of the season or series release (e.g., via VHS, DVD, Blu-ray) during a home video distribution window.

BRIEF DESCRIPTION OF DRAWINGS

The embodiments disclosed in the present disclosure are illustrated by way of example, and not by way of limitation, in the figures of the accompanying drawings. Like reference numerals refer to corresponding parts throughout the drawings.

DETAILED DESCRIPTION

Although the disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various embodiments, a system and method to access content, a selection of a media content item having at least one set of episodes may be received. In response thereto, each of the at least one set of episodes is displayed as a user-selectable element in a user interface. A selection of a user-selectable element corresponding to a set of the at least one set of episodes may be further received. In response thereto, the display of the selected user-selectable element is expanded to display the episodes of the set within the selected user-selectable element, with each episode of the episodes of the set being represented by an additional user-selectable element. A selection of an episode from the set of episodes may be further received, and in response thereto, at least one content source from which the selected episode is available to be retrieved may be displayed. A content source of the at least one content source from which the selected episode is to be retrieved may be received.

Figure 1:
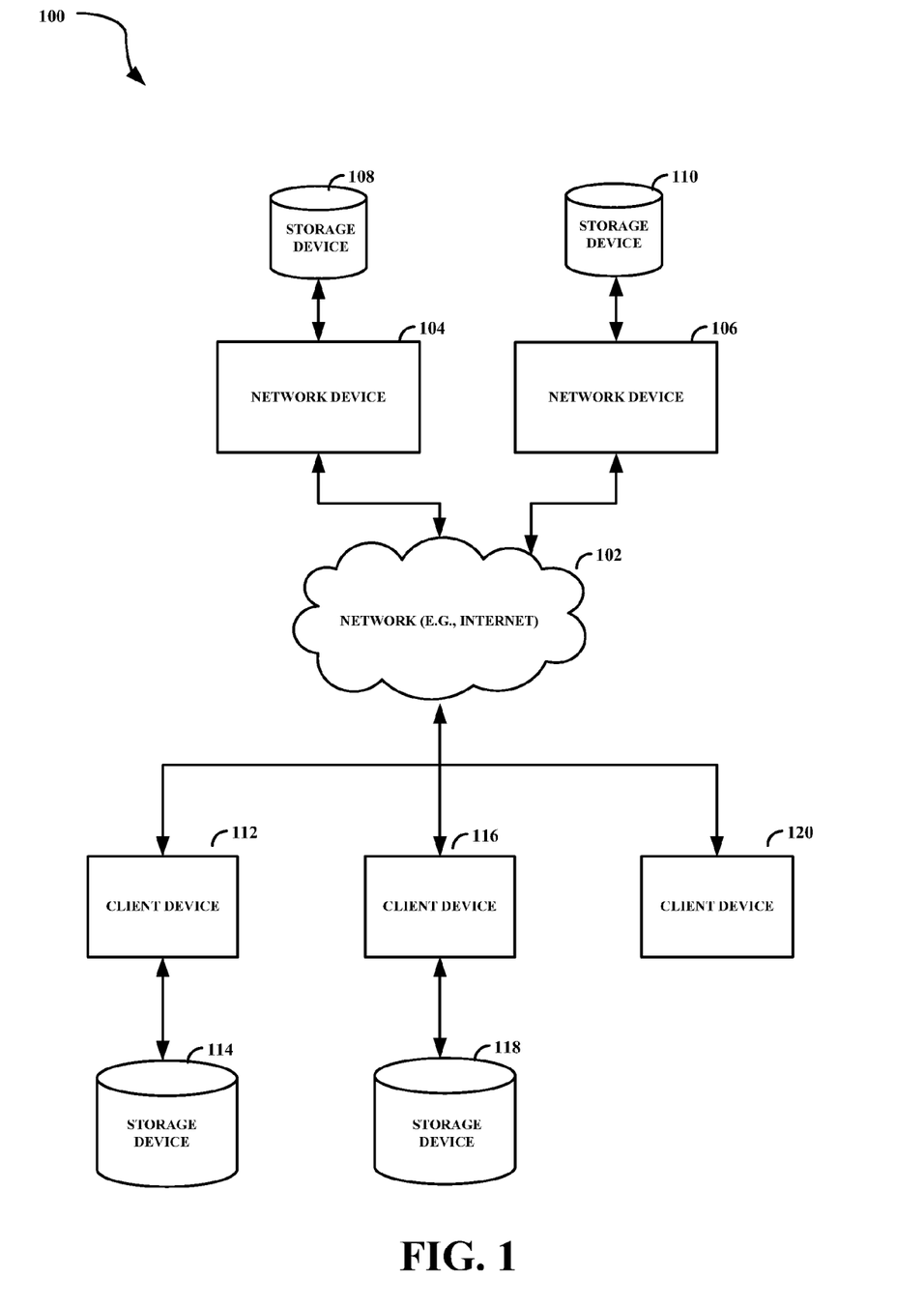
FIG. 1 is a block diagram illustrating a network system having an architecture configured for exchanging data over a network, according to some embodiments.

FIG. 1 is a block diagram illustrating an example network system 100 connecting one or more client devices 112, 116, and 120 to one or more network devices 104 and 106 via a network 102. The one or more client devices 112, 116, and 120 may include Internet- or network-enabled devices, such as consumer electronics devices (e.g., televisions, DVD players, Blu-Ray® players, set-top boxes, portable audio/video players, gaming consoles) and computing devices (e.g., personal computer, laptop, tablet computer, smart phone, mobile device). The type of client devices is not intended to be limiting, and the foregoing devices listed are merely examples. The client devices 112, 116, and 120 may have remote, attached, or internal storage devices 114, 118. For illustrative purposes only, although client devices 112 and 116 are shown in FIG. 1 as having connected storage devices 114 and 118, respectively, and client device 120 is shown without a connected storage device, in some embodiments, each client device 112, 116, and 120 may have local access to one or more storage or memory devices.

In some embodiments, one or more of the client devices 112, 116, and 120 may have installed thereon and may execute a client application (not shown) that enables the client device to serve as a local media server instance. The client application may search for and discover media content (e.g., audio, video, images) stored on the device as well as media content stored on other networked client devices having the client application installed thereon. The client application may aggregate the discovered media content, such that a user may access local content stored on any client device having the client application installed thereon. In some embodiments, the aggregated discovered media content may be separated by device, such that a user is aware of the network devices connected to a particular device and the content stored on the connected network devices. In some embodiments, each connected network device may be represented in the application by an indicator, such as an icon, an image, or a graphic. When a connected network device is selected, the indicator may be illuminated or highlighted to indicate that that particular network device is being accessed.

In some embodiments, the discovered media content may be stored in an aggregated data file, which may be stored on the client device. The local content may be indexed by the client device in which the content resides. The client application also may aggregate and present a variety of remote sources to the user from which the user is able to download, stream, or otherwise access a particular media content item. For example, the client application may present to the user all streaming, rental, and purchase options for a particular media content item to the extent they exist and are available for access.

One or more network devices 104 and 106 may be communicatively connected to the client devices 112, 116, and 120 via network 102. In some embodiments, the network devices 104 and 106 may be servers storing media content or metadata relating to media content available to be accessed by the client devices 112, 116, and 120. In some embodiments, the network devices 104 and 106 may include proprietary servers related to the client application as well as third party servers hosting free or subscription-based content. Additional third-party servers may include servers operating as metadata repositories and servers hosting electronic commerce sites. For example, in the context of movies, third-party servers may be servers associated with the themoviedb.org and other third-party aggregators that store and deliver movie metadata in response to user requests. In some embodiments, some of the third-party servers may host websites offering merchandise related to a content item for sale. The network devices 104 and 106 may include attached storage devices or may interface with databases or other storage devices 108 and 110. For illustrative purposes only, the network devices 104 and 106 each have been shown as a single device in FIG. 1, although it is contemplated that the network devices 104 and 106 may include one or more web servers, application servers, database servers, and so forth, operating independently or in conjunction to store and deliver content via network 102.

In some embodiments where one or more of the network devices 104 and 106 are proprietary servers associated with the client application, the proprietary servers may store metadata related to media content and data that facilitates identification of media content across multiple content servers. For example, the proprietary servers may store identifiers for media content that are used to interface with third party servers that store or host the media content. The proprietary servers further may include one or more modules capable of verifying the identity of media content and providing access information concerning media content (e.g., the source(s) of media content, the format(s) of media content, the availability of media content).

The client application installed on one or more of the client devices 112, 116, and 120 may enable a user to search for media content or navigate among categories of media content. To find media content, a user may enter search terms in a user interface of the client application to retrieve search results, or the user may select among categories and sub-categories of media content to identify a particular media content item. For each browsed content item, the client application may display metadata associated with the content item. The metadata may be retrieved from both local and remote sources. The metadata may include but are not limited to a title of the content item, one or more images (e.g., wallpapers, backgrounds, screenshots) or video clips related to the content item, a release date of the content item, a cast of the content item, one or more reviews of the content item, and release windows and release dates for various distribution channels for the browsed content item.

Figure 2:
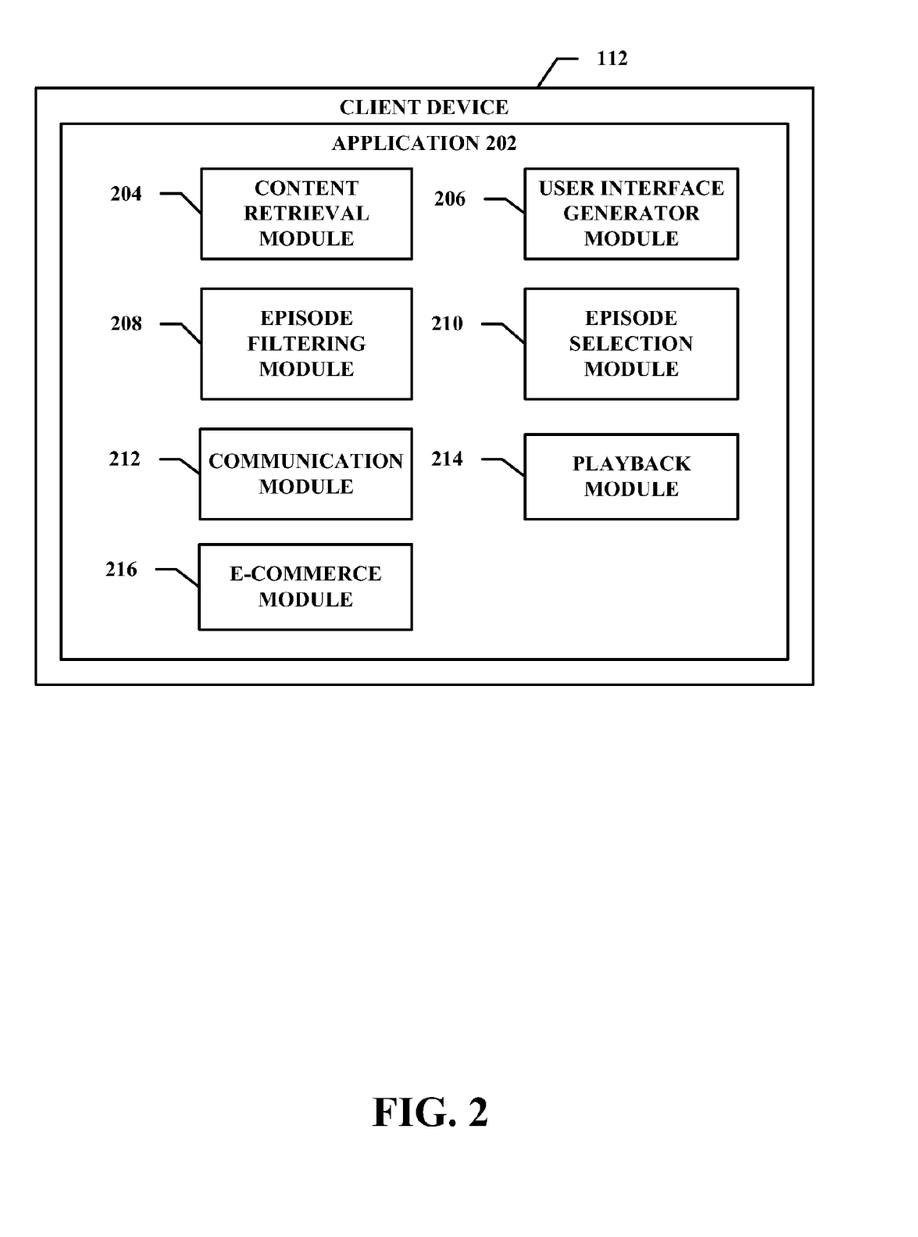
FIG. 2 is a block diagram illustrating modules of an application, according to some embodiments.

FIG. 2 is a block diagram illustrating modules of an application, according to some embodiments. Although the modules are shown in FIG. 2 as being part of a client device, it is contemplated that the modules may be implemented on a network device, such as a server. In an example embodiment, the application 202 may be the client application discussed with reference to FIG. 1. In an example embodiment, one or more processors of a client device or a network device may execute or implement the modules.

The application 202 includes modules, such as a content retrieval module 204, a user interface generator module 206, an episode filtering module 208, an episode selection module 210, a communication module 212, and a playback module 214, and an electronic commerce (e-commerce) module 216 to perform operations, according to some embodiments.

The content retrieval module 204 may retrieve content and content-related data from networked devices, such as content sources and metadata repositories. Content sources may include both locally networked sources (e.g., other networked devices executing the application 202) and remote sources, such as third party content providers. In some embodiments, the content retrieval module 204 may retrieve metadata related to content items and may use the metadata to populate a user interface with information related to content items, such as movies and television programs. For example, the content retrieval module 204 may retrieve metadata such as a cover art, screenshots, content descriptions, plot synopses, and cast listings. In some embodiments, the metadata may be displayed as part of listings of content presented to a user during application navigation and search operations. For example, the metadata may be displayed when a user is navigating among categories of content or is searching for a particular content item. Each content item discovered during navigation or searching may be populated with the retrieved metadata.

In some embodiments, the metadata retrieved by the content retrieval module 204 may pertain to episodic content, such as television programs, documentaries, and mini-series. The metadata may include information about the seasons of an episodic content item and information about particular episodes. The metadata permits a user to navigate among different seasons and episodes of a particular content item to discover further details about the seasons and episodes as well as select a particular episode for viewing.

In some embodiments, the content retrieval module 204 also retrieves information pertaining to content sources that store and make available episodic content for viewing. For example, different content providers may provide access to different episodic content items owing to the fact that different content providers own or have distribution rights to different pieces of content. The content retrieval module 204 retrieves the sources of content from metadata repositories or from the content sources themselves and provides the sources for display with the content items. When a user selects a particular episode and a particular content source hosting the episode for viewing, the content retrieval module 204 retrieves the episode.

The user interface generator module 206 generates one or more user interfaces for the application 202. The user interfaces enable a user to browse, search, and navigation among content items. In some embodiments, the user interface generator module 206 may generate a series of user interfaces in response to a user selecting a category of media content having episodes or programs. A first user interface may display one or more media content items, such as television programs to the user. Each television program may be represented by an image related to the television program, such as art work or cover art related to the television program. Each image representing the television program may be a user-selectable user interface element whose selection causes the user interface generator module 206 to generate populate a portion of the user interface with television program details, such as a description of the show, the time period during which the show is or was broadcast, the channel or studio broadcasting the show, and so forth. In some embodiments, selecting the television program image may cause the user interface generator module 206 to generate a second user interface that is directed to details about the selected television program. In other embodiments, a separate user-selectable element is provided for navigating a user to the second user interface concerning the details of the television program.

The second user interface generated by the user interface generator module 206 may include some or all of an image of the television program, such as cover art or a screenshot from the television program, a "Watch Now" panel featuring different content sources from which the television program may be viewed, an episode details panel containing detailed information about an episode of the television program, and a navigable section of the user interface containing individual user-selectable user interface elements corresponding to the seasons of the television program. In some embodiments, the navigable season panel for the television program may be a horizontally oriented container holding the individual user-selectable user interface elements corresponding to the seasons of the television program. In the event a television program has aired for more seasons that the navigable season panel can display, the user may navigate among the seasons using direction arrows or touch-based gestures, such as swipes.

In response to a selection of a user interface element corresponding to a season of the television program, the user interface element corresponding to the season may expand to reveal additional user interface elements, with each additional user interface element corresponding to an episode of the season of the television program. In response to a selection of an episode, the user interface generator module 206 may visually emphasize the user-selectable user interface element corresponding to the selected episode. Visual emphasis may include enlarging the size of the user interface element, inserting a screenshot or other image from the episode into the user interface element, bolding or thickening the border of the user interface element, or otherwise representing the user interface element in a manner as to distinguish it from the other user interface elements.

In response to the selection of an episode, the user interface generator module 206 also may generate a third user interface element having a panel devoted to an image related to the television program or the particular selected episode, a "Watch Now" panel listing the various content sources from which the episode may be retrieved, and an Episode Details panel providing information about the selected episode. The "Watch Now" panel may include a list of content sources from which the episode may be accessed. The content sources may be sub-divided according to distribution channel type, such that content sources offering the episode for free are grouped together, content sources offering the episode as part of a subscription-based service are grouped together, and content sources offering the episode for purchase (e.g., download, physical media) are grouped together. The Episode Details panel may include information concerning the episode, such as a first air date, a plot synopsis, and a running time of the episode.

The episode filtering module 208 may provide a filtering engine and interface by which a user may filter the display of episodes according to one or more filtering criteria. The filtering engine may present commonly used filters, for example, in the form of checkboxes, and/or a user input element. Commonly used filters may include character names, episode or plot locations, episode titles, episode air dates, running times, seasons, and so forth. The user input element enables the user to submit his own filtering criteria that may be compared against episode metadata to identify episodes to filter. In some embodiments, episodes meeting the filtering criteria will be surfaced and visually emphasized by the user interface generator module 206. For example, if a user was filtering a particular season of the television show "Seinfeld®" and wanted to only see episodes featuring an appearance by the "Soup Nazi," only those episodes featuring the "Soup Nazi" would be visually emphasized. In some embodiments, the user interface elements corresponding to the other episodes not featuring the "Soup Nazi" may be hidden, made opaque, reduced in size, or otherwise de-emphasized. In other embodiments, episodes meeting the filtering criteria may be hidden or removed from the user interface. For example, if a user was filtering a particular season of the television show "Lost®" and did not want to see any episodes featuring the "Smoke Monster," those episodes would be de-emphasized.

The episode selection module 210 may receive and process the selection of a user interface element corresponding to an episode by the user. In turn, the episode selection module 210 may prompt the user interface generator module 206 to generate a user interface containing additional details for the selected episode. The episode selection module 210 also may receive the selection of a content source from which the user desires to access the selected episode. In some embodiments, the episode selection module 210 may formulate a request, such as an Application Programming Interface (API) call, to the selected content source to access and retrieve the selected episode.

The communication module 212 may interact with remote sources (e.g., content sources, metadata repositories) and locally networked devices to receive data and transmit requests. For example, the communication module 212 may transmit a request, such as an API call, generated by the episode selection module 210 to a selected content source to retrieve and access a selected episode.

The playback module 214 may receive packets of data corresponding to a selected episode from the communication module 212 and play back the selected episode in the application 202. The playback module 214 may be configured to handle both streaming media content as well as downloaded media content files.

The e-commerce module 216 may facilitate transacting and payment for certain content items, in some embodiments. For example, if a user selects a content source that requires the user to pay for access to an episode, the e-commerce module 216 may facilitate the purchase transaction with the third party content source. In some embodiments, the e-commerce module 216 may provide a secure order form or web page that is used to collect the user's personal and financial information. The e-commerce module 216 may operate in conjunction with the communication module 212 to transmit the order information to the content source to complete the transaction. In some embodiments, the e-commerce module 216 may merely provide a secure connection to re-direct the user to the third party content source, with the transacting of the purchase handled solely by the content source.

Figure 3:
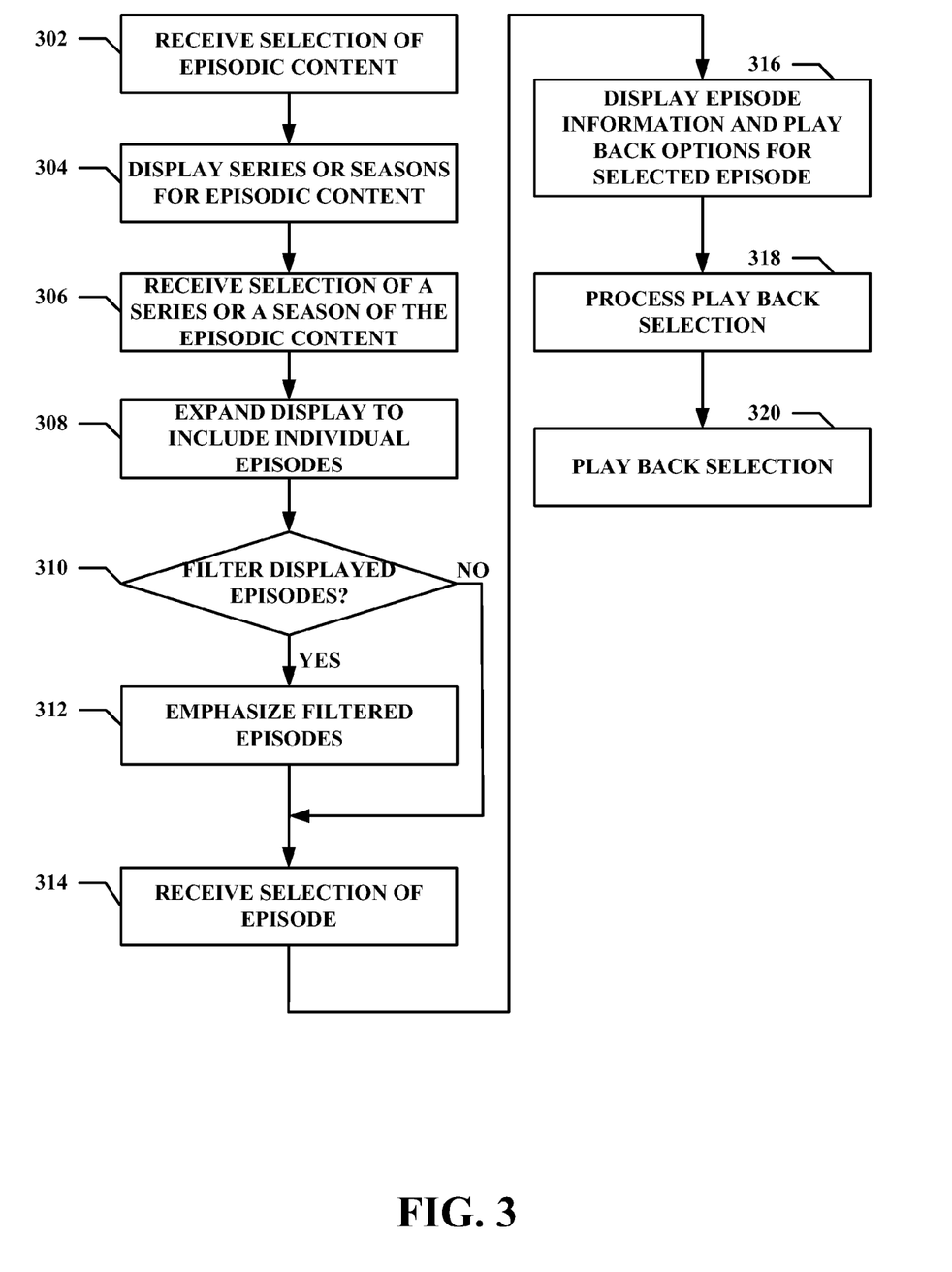
FIG. 3 is a flow diagram illustrating an example method for selecting an episode for play back, according to some embodiments.

FIG. 3 is a flow diagram illustrating an example method for selecting an episode for play back, according to some embodiments. Referring to FIG. 3, at block 302, an application executing on a client device may receive a selection of a media content item that comprises episodic content. The media content item may be selected as a result of a user browsing among content item categories and content items or as a result of a search for a specific media content item. In some embodiments, the media content item may be a television program, a mini-series, or a documentary.

At block 304, in response to the selection of the media content item, a listing of seasons or series of the content item may be presented to the user. The seasons may be presented in a user interface panel, with each season being represented by a user-selectable user interface element. In some embodiments, the user interface elements corresponding to the seasons may be presented in a horizontally-oriented panel in the user interface. In the event the media content item consists of more seasons than are able to be displayed in the user interface, the user may scroll among the seasons in the user interface panel. In some embodiments, scrolling may be accomplished using touch-based gestures, selection of direction arrows by a first user input device (e.g., mouse), or selection of direction arrows using keys or buttons on a second user input device (e.g., keyboard, remote control).

At block 306, the application may receive a selection of a particular season of the media content item. A season may be selected by selecting the user interface element corresponding to the season. Selection of the user interface element may occur using touch-based gestures (e.g., a single or double tap) or user input device actuations (e.g., mouse click, selection of a key on a keyboard or remote control). In response to the selection of a season, certain user interface elements may be populated with information about the selected season. For example, a season detail panel may include information about the season, including a date of airing, a general description or synopsis of the season's events or highlights, and a number of episodes in the season. An image panel may be updated with one or more screenshots from the season. In some embodiments, the screenshots may cycle in a slideshow format.

At block 308, in response to the selection of a season of a content item, the user interface element corresponding to the selected season may be expanded to reveal additional user interface elements corresponding to individual episodes belonging to the season. Each additional user interface element corresponding to an individual episode may be user-selectable. In some embodiments, the user interface element corresponding to the selected season may expand horizontally to accommodate the individual episodes of the season.

At block 310, an episode filtering module having a filtering engine with a filtering interface may be presented to the user to optionally filter the displayed episodes by one or more filtering criteria. One of ordinary skill in the art should appreciate that the filtering engine may be presented to the user at any point in the navigational flow of the application. The filtering interface may present commonly used filtering criteria to the user, for example, in the form of checkboxes. For example, commonly used filtering criteria may include character appearances, episode plot locations, date of airing, guest appearances, and so forth. Additional filtering options may be provided to the user in the form of a freeform text box that enables a user to enter his own filtering criteria.

At block 312, if filtering criteria is entered, the filtering engine may compare the filtering criteria with episode metadata to determine which episodes should be filtered. Filtering may comprise emphasizing certain episodes or de-emphasizing episodes, depending on the filter used. Based on the results of the filter, the user interface generator module 206 may visually emphasize certain episodes, such as by highlighting the episode user interface element, enlarging the size of the episode user interface element, or marking the episode user interface element. The user interface generator module 206 also may de-emphasize certain episodes, such as by reducing the size of the episode user interface element, increasing the opacity or translucency of the episode user interface element, or eliminating the episode user interface element.

If filtering criteria is not entered, at block 314, the application may receive a selection of an episode. Selection of an episode may cause the user interface element corresponding to the selected episode to become enlarged in size to indicate selection of episode. In addition or instead, the user interface element of the selected episode may be populated with an image, such as a screenshot obtained from the episode.

At block 316, selection of an episode also may cause episode information and play back options for the selected episode to be populated in the user interface. For example, episode information may be populated in an episode detail panel. Episode information may include a description of the episode, a date of airing, a running time of the episode, and a channel or studio that first broadcast the episode. Play back options may be included in a "Watch Now" panel. Play back options may comprise the different content sources from which the episode may be accessed and viewed. The different content sources may be delineated in the "Watch Now" panel by a distribution channel type. For example, the "Watch Now" panel may group free content sources together, subscription-based content sources together, and retail or purchase-based content sources together. Thus, a user is able to quickly determine the different viewing options and costs associated therewith for viewing the episode.

At block 318, the application may process a selected play back option. Processing of the selected play back option may entail generating a request to be sent to the selected content source. The request may include an API call to interface with the content source. The parameters of the API call may depend in part on the play back option selected, as a subscription-based content source may require a user name and password, while a purchase-based content source may require payment information.

At block 320, the episode may be received from the selected content source and may be played back by the application for viewing by the user. The application may handle multiple play back options, including streaming video and locally stored video files (e.g., a downloaded episode file).

Figure 4A:
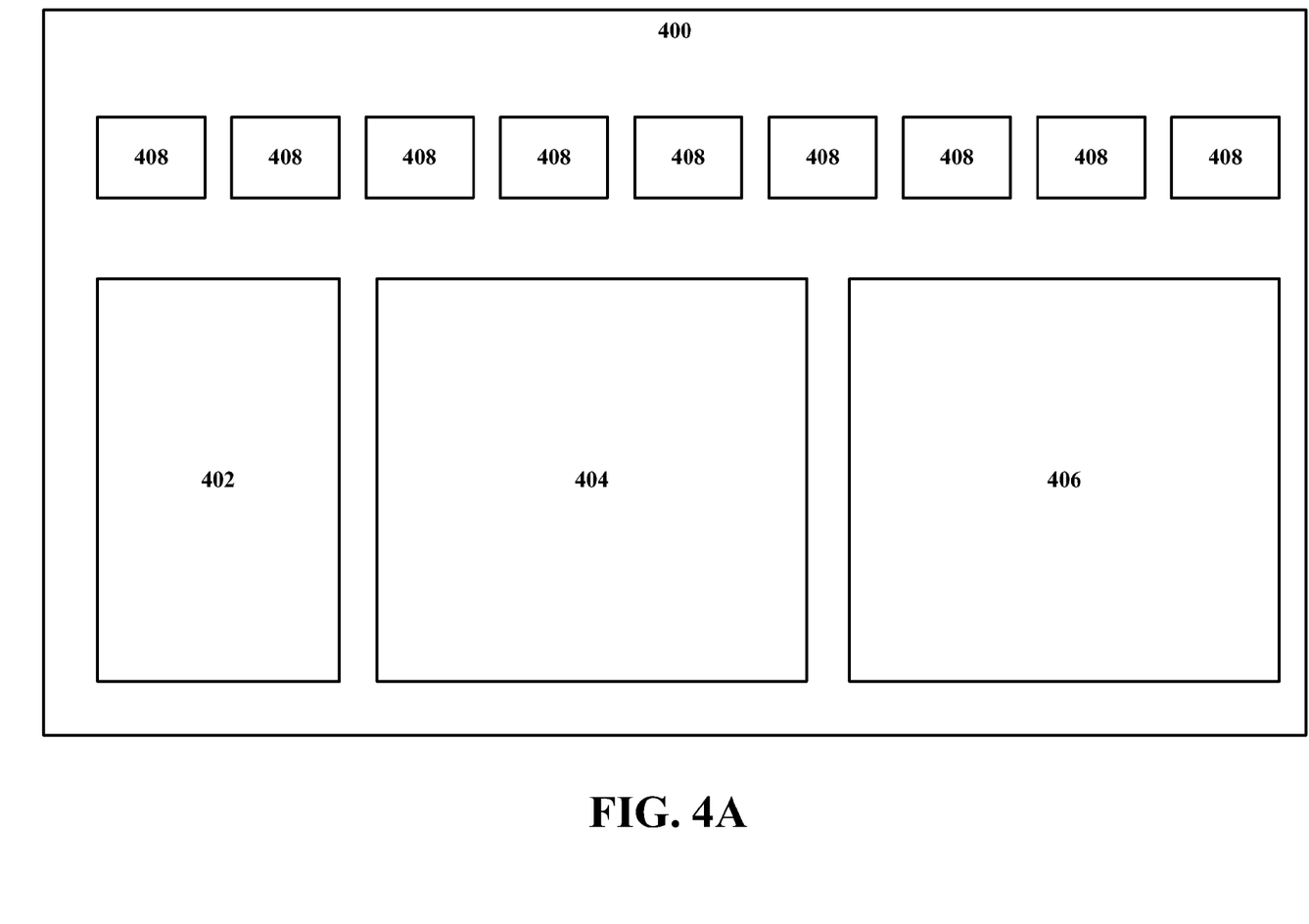
FIG. 4A is a diagram of an example user interface for presenting episodic content for selection, according to some embodiments.

FIG. 4A is a diagram of an example user interface for presenting episodic content for selection, according to some embodiments. The example user interface 400 may include multiple user-selectable user interface elements. For example, the example user interface 400 includes a first user interface element 402 that may correspond to an image related to a content item. The first user interface element 402 may display cover art, screenshots, and art work that are related to a selected content item, a selected season of the content item, or a selected episode of a content item.

A second user interface element 404 may represent a "Watch Now" panel that lists the different content sources from which an episode may be downloaded. The second user interface element 404 may separate content sources by cost or distribution channel type. For example, content sources from which the episode may be viewed for free may be grouped together and displayed at the top of the second user interface element 404. Content sources from which the episode may be viewed as part of a subscription-based service may be grouped together and displayed in the middle of the second user interface element 404. Content sources from which the episode may be purchased may be grouped together and displayed at the bottom of the second user interface element 404. Each content source may have its name displayed in the second user interface element 404 along with a cost to retrieve the episode therefrom.

A third user interface element 406 may represent an "Episode Details" panel that provides information related to a selected episode, including but not limited to a description of the episode, a running time of the episode, an original air date of the episode, and a studio or channel that first aired or broadcasted the episode.

Additional user interface elements 408 may be horizontally oriented and located at near the top of the example user interface 400. In some embodiments, the user interface elements 408 may each represent a season of the content item. Each of the user interface elements 408 may be user-selectable.

Figure 4B:
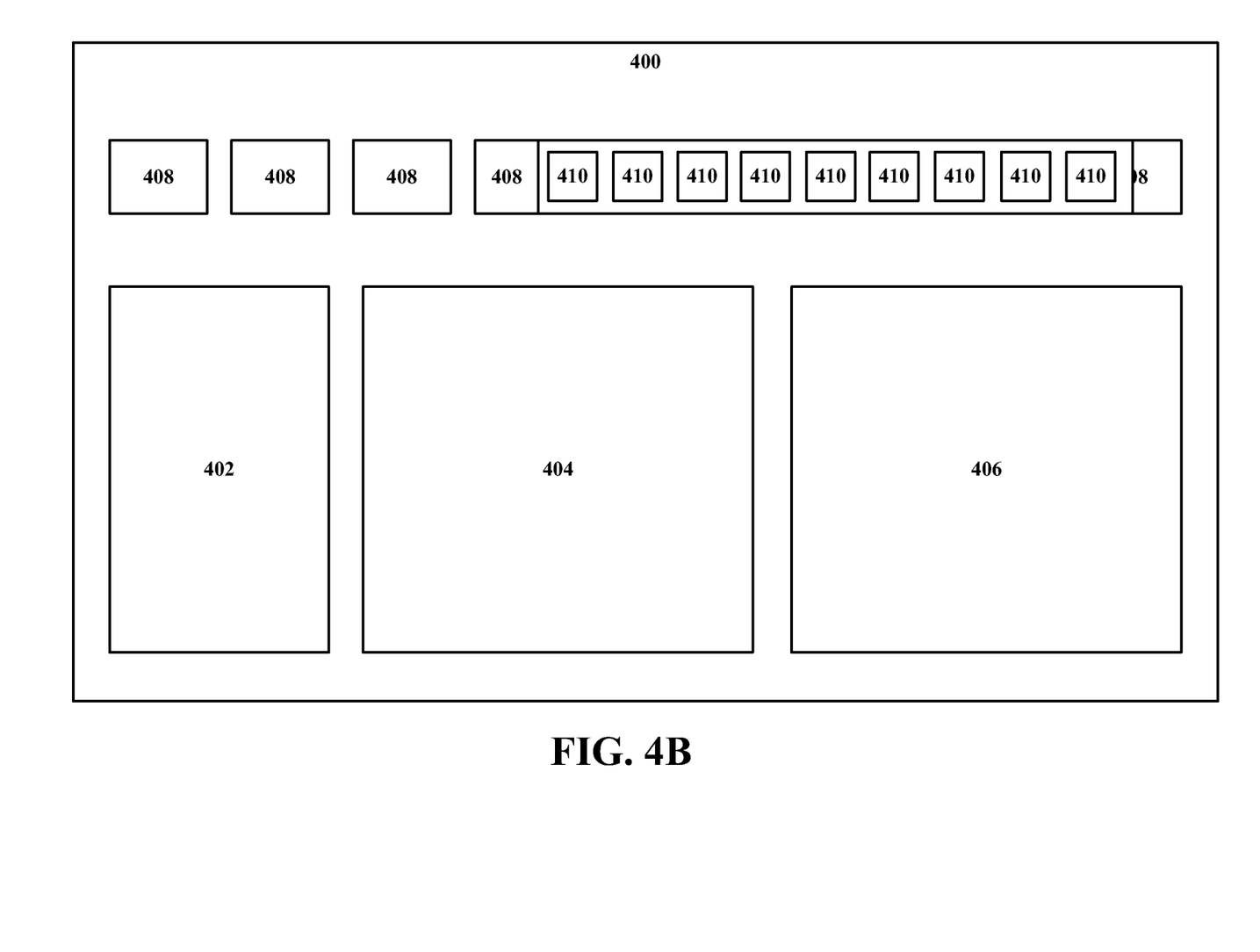
FIG. 4B is a diagram of an example user interface for presenting episodic content for selection, according to some embodiments.

FIG. 4B is a diagram of an example user interface for presenting episodic content for selection, according to some embodiments. Referring to FIG. 4B, the example user interface 400 depicts a scenario where a user has selected one of the user interface elements 408 corresponding to a season of a media content item. In response to the selection of the season user interface element 408, the user interface element 408 may expand or slide to reveal a panel containing one or more additional user interface elements 410 corresponding to episodes of the selected season. Each additional user interface element 410 may be user-selectable.

Figure 4C:
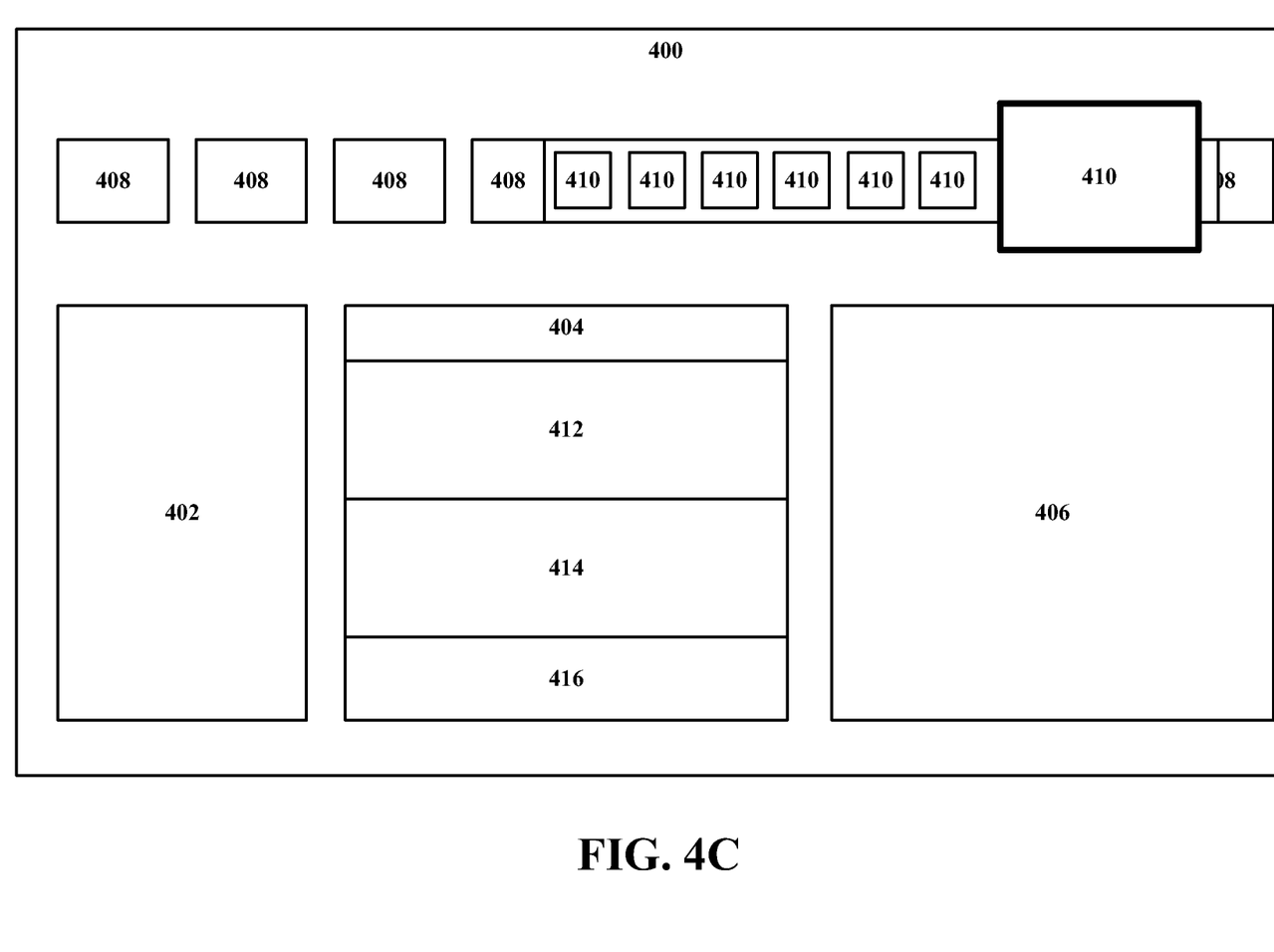
FIG. 4C is a diagram of an example user interface for presenting episodic content for selection, according to some embodiments.

FIG. 4C is a diagram of an example user interface for presenting episodic content for selection, according to some embodiments. Referring to FIG. 4C, the example user interface 400 depicts a scenario where a user has selected one of the additional user interface elements 410 corresponding to a particular episode of the season of the content item. In some embodiments, the selected episode 410 may be visually emphasized within the user interface 400. In the example embodiment of FIG. 4C, the user interface element 410 corresponding to the selected episode has been enlarged in size, although in other embodiments, the user interface element 410 also or instead may be populated with an image, such as a screenshot, related to the particular episode.

Selection of the episode may cause other user interface elements of the example user interface 400 to be populated with information. For example, selection of the episode may cause user interface element 406 to be populated with episode details previously described herein. Selection of the episode also may cause user interface element 404 to be populated with different content source options for viewing the episode. For example, user interface element 404 may be populated with user interface elements 412, 414, and 416 that correspond to free content sources, subscription-based content sources, and retail or purchase-based content sources, respectively. Each of user interface elements 412, 414, and 416 may include user-selectable elements enabling a user to select a content source from which the episode may be viewed. Selection of the episode also may cause user interface element 402 to be populated with one or more images related to the selected episode. The images may be screenshots or other art associated with the episode.

Figure 4D:
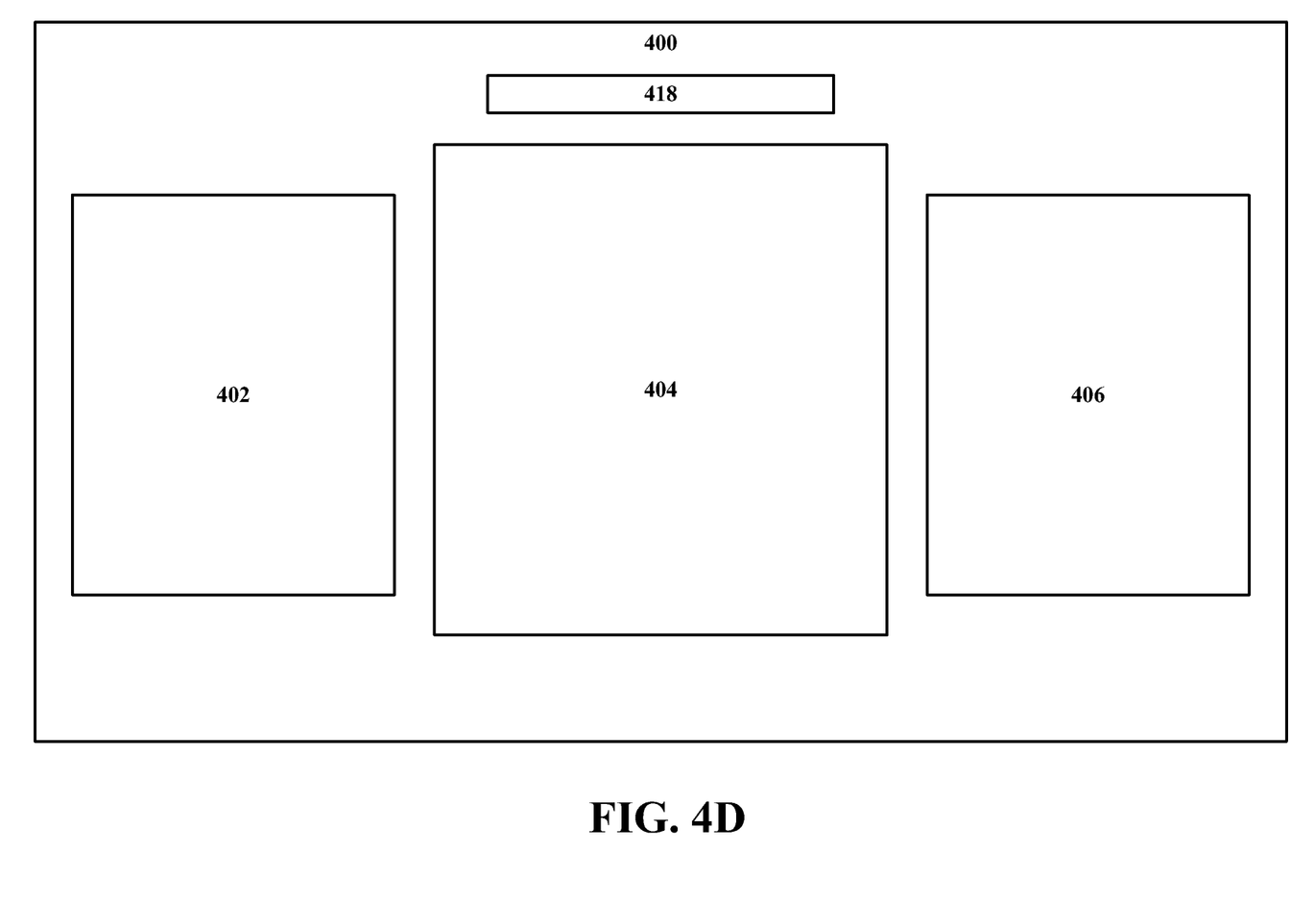
FIG. 4D is a diagram of an example user interface for presenting episodic content for selection, according to some embodiments.

FIG. 4D is a diagram of an example user interface for presenting episodic content for selection, according to some embodiments. Referring to FIG. 4D, in some embodiments, in response to the selection of an episode, the example user interface 400 may more prominently display the episode user interface elements 402, 404, and 406. In some embodiments, in response to a user command, the "Watch Now" panel 404 may be enlarged and prominently displayed in the user interface 400. The episodes and/or seasons displayed near the top of the user interface 400 may be correspondingly reduced in size to a smaller user interface element 418.

Modules, Components and Logic

Certain embodiments are described herein as including logic or a number of components, modules, or mechanisms. A component or module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components at different times. Software may accordingly configure a processor, for example, to constitute a particular component or module at one instance of time and to constitute a different component or module at a different instance of time.

Components or modules can provide information to, and receive information from, other components or modules. Accordingly, the described components may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 5:
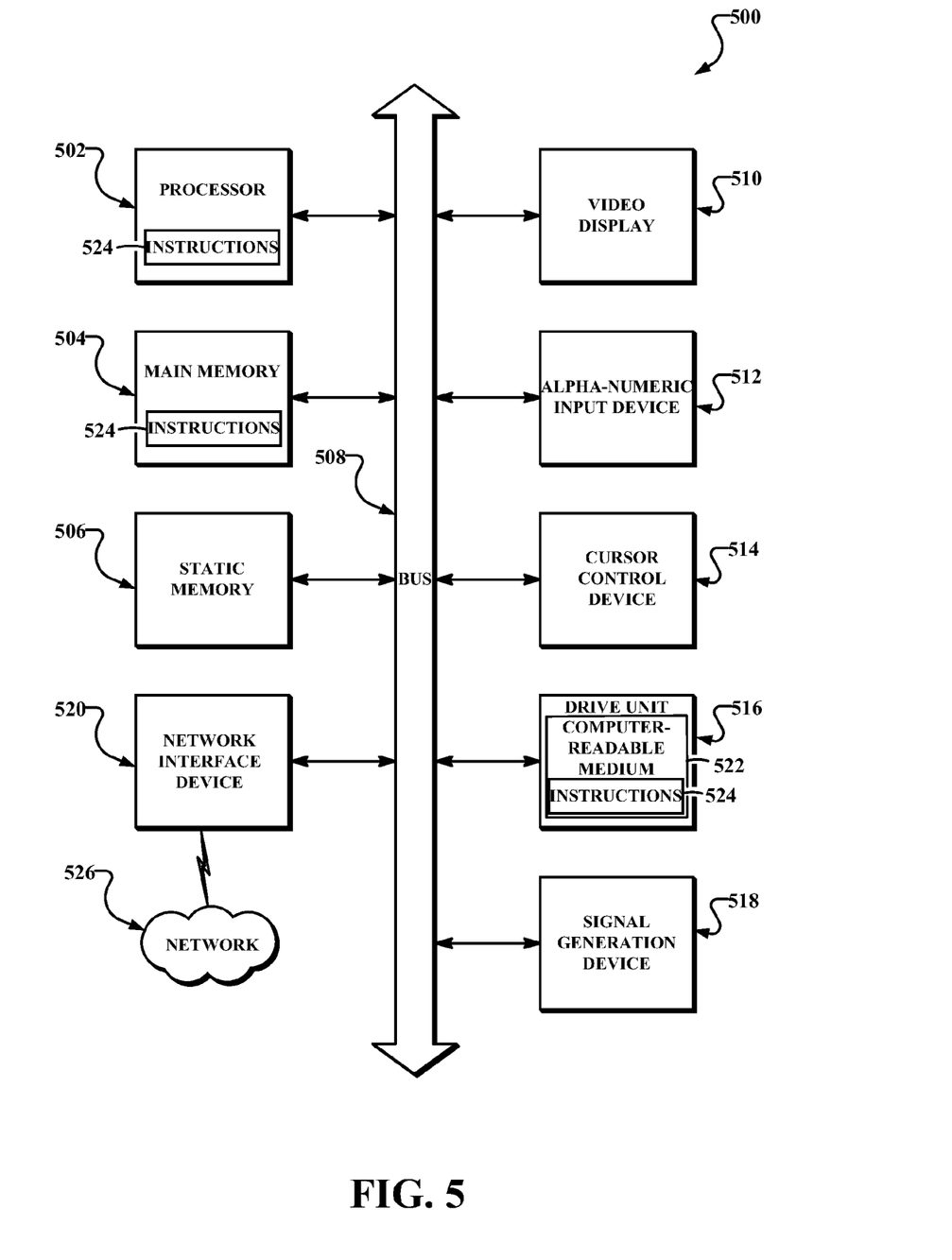
FIG. 5 shows a diagrammatic representation of a machine in the example form of a computer system.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes at least one processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any non-transitory tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 524 may further be transmitted or received over a communications network 526 using a transmission medium. The software 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third storage tier may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, or server computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server and/or client software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
   receiving a selection of a media content item comprising at least one set of episodes;
   causing, by at least one processor, a plurality of image panels to be displayed in a row in a top portion of a user interface, each image panel corresponding to a set of episodes, each image panel comprising a user-selectable element in a screenshot from the corresponding set of episodes;
   receiving a selection of the user-selectable element from the corresponding set of episodes of an image panel;
   causing, by the at least one processor, the user-selectable element of the image panel to expand and slide along the row of the plurality of image panels and reveal a second panel containing additional user interface elements corresponding to episodes of the set, the second panel covering a portion of the image panels from the row of the plurality of image panels;

receiving a selection of an episode from the set of episodes within the second panel;

causing, by the at least one processor, the display, in a bottom portion of the user interface, of at least one content source from which the selected episode is available to be retrieved; and receiving a selection of a content source of the at least one content source from which the selected episode is to be retrieved.

2. The method of claim 1, wherein the media content item is one of a television show, a television mini-series, and a documentary.

3. The method of claim 1, wherein the each of the at least one set of episodes is a season.

4. The method of claim 1, further comprising causing at least one of an image related to the media content and information related to the selected episode to be displayed in the user interface.

5. The method of claim 1, further comprising causing the additional user-selectable element corresponding to the selected episode to be visually emphasized.

6. The method of claim 1, further comprising providing a filtering interface to filter the display of the additional user-selectable elements corresponding to the episodes of the set of episodes according to at least one filtering criterion, wherein the filtering interface visually emphasizes the additional user-selectable elements that correspond to a subset of episodes that comprise results of the at least one filtering criterion.

7. The method of claim 1, further comprising:
transmitting a request to the content source to retrieve the selected episode; and
playing back the retrieved selected episode.

8. The method of claim 1, wherein the at least one content source from which the selected episode is available to be retrieved includes at least one of a content source offering the selected episode for free, a content source offering the selected episode according to a subscription, and a content source offering the selected episode for purchase.

9. The method of claim 1, wherein the causing of the display of the selected user-selectable element to be expanded to display the episodes of the set within the selected user-selectable element comprises causing the selected user-selectable element to expand horizontally, and wherein the additional user-selectable element corresponding to each episode comprises a screenshot from the respective episode.

10. The method of claim 1, further comprising facilitating navigation among the at least one set of episodes and the episodes of the at least one set of episodes in response to an input touch gesture.

11. A non-transitory machine-readable storage medium storing a set of instructions that, when executed by at least one processor, causes the at least one processor to perform operations comprising:
receiving a selection of a media content item comprising at least one set of episodes;
causing a plurality of image panels to be displayed in a row in a top portion of a user interface, each image panel corresponding to a set of episodes, each image panel comprising a user-selectable element in a screenshot from the corresponding set of episodes;
receiving a selection of the user-selectable element from the corresponding set of episodes of an image panel;
causing the user-selectable element of the image panel to expand and slide along the row of the plurality of image panels and reveal a second panel containing additional user interface elements corresponding to episodes of the set, the second panel covering a portion of the image panels from the row of the plurality of image panels;
receiving a selection of an episode from the set of episodes within the second panel;
causing the display, in a bottom portion of the user interface, of at least one content source from which the selected episode is available to be retrieved; and
receiving a selection of a content source of the at least one content source from which the selected episode is to be retrieved.

12. The non-transitory machine-readable storage medium of claim 11, wherein the media content is one of a television show, a television mini-series, and a documentary.

13. The non-transitory machine-readable storage medium of claim 11, wherein the each of the at least one set of episodes is a season.

14. The non-transitory machine-readable storage medium of claim 11, further comprising causing at least one of an image related to the media content and information related to the selected episode to be displayed in the user interface.

15. The non-transitory machine-readable storage medium of claim 11, further comprising causing the additional user-selectable element corresponding to the selected episode to be visually emphasized.

16. The non-transitory machine-readable storage medium of claim 11, further comprising providing a filtering interface to filter the display of the additional user-selectable elements corresponding to the episodes of the set of episodes according to at least one filtering criterion, wherein the filtering interface visually emphasizes the additional user-selectable elements that correspond to a subset of episodes that comprise results of the at least one filtering criterion.

17. The non-transitory machine-readable storage medium of claim 11, further comprising:
transmitting a request to the content source to retrieve the selected episode; and
playing back the retrieved selected episode.

18. The non-transitory machine-readable storage medium of claim 11, wherein the at least one content source from which the selected episode is available to be retrieved includes at least one of a content source offering the selected episode for free, a content source offering the selected episode according to a subscription, and a content source offering the selected episode for purchase.

19. The non-transitory machine-readable storage medium of claim 11, wherein the causing of the display of the selected user-selectable element to be expanded to display the episodes of the set within the selected user-selectable element comprises causing the selected user-selectable element to expand horizontally, and wherein the additional user-selectable element corresponding to each episode comprises a screenshot from the respective episode.

20. The non-transitory machine-readable storage medium of claim 11, further comprising facilitating navigation among the at least one set of episodes and the episodes of the at least one set of episodes in response to an input touch gesture.

21. A system, comprising:
a processor-implemented episode selection module configured to:

receive a first selection of a user-selectable element corresponding to a set of episodes of at least one set of episodes;

receive a second selection of an additional user-selectable element corresponding to an episode of the set of episodes; and receive a selection of a content source from which the selected episode is to be retrieved; and a processor-implemented user interface generator module configured to:

generate a user interface that displays each of the at least one set of episodes as an image panel in a row in a top portion of the user interface, each image panel comprising a user-selectable element in a screenshot from a corresponding set of episodes;

expand the selected user-selectable element along the row of the plurality of image panels and reveal a second panel containing additional user interface elements corresponding to episodes of the set, the second panel covering a portion of the image panels from the row of the plurality of image panels; and display in a bottom portion of the user interface at least one content source from which the selected episode is available to be retrieved.

22. The system of claim 21, further comprising a processor-implemented episode filtering module configured to filter the display of the additional user-selectable elements corresponding to the episodes of the set of episodes according to at least one filtering criterion, wherein the processor-implemented episode filtering module visually emphasizes the additional user-selectable elements that correspond to a subset of episodes that comprise results of the at least one filtering criterion.

23. The system of claim 21, further comprising a processor-implemented content retrieval module configured to retrieve media content comprising at least one set of episodes.

24. The system of claim 21, further comprising:
a processor-implemented communication module configured to transmit a request to the content source to retrieve the selected episode; and
a processor-implemented play back module configured to play back the retrieved selected episode.

25. The system of claim 21, wherein the at least one content source from which the selected episode is available to be retrieved includes at least one of a content source offering the selected episode for free, a content source offering the selected episode according to a subscription, and a content source offering the selected episode for purchase.

26. The system of claim 25, further comprising a processor-implemented e-commerce module configured to process a transaction involving the selected episode based on the content source selection being one of the content source offering the selected episode according to the subscription and the content source offering the selected episode for purchase.

27. The system of claim 21, wherein the processor-implemented user interface generator module is configured to cause of the display of the selected user-selectable element to be expanded to display the episodes of the set within the selected user-selectable element by causing the selected user-selectable element to expand horizontally, and wherein the additional user-selectable element corresponding to each episode comprises a screenshot from the respective episode.

28. The system of claim 21, wherein the processor-implemented user interface generator module is further configured to cause the additional user-selectable element corresponding to the selected episode to be visually emphasized.

* * * * *